(12) United States Patent
Itabashi et al.

(10) Patent No.: US 10,255,899 B2
(45) Date of Patent: Apr. 9, 2019

(54) NOISE REDUCTION DEVICE AND NOISE REDUCTION METHOD

(71) Applicant: SONY CORPORATION, Tokyo (JP)

(72) Inventors: Tetsunori Itabashi, Kanagawa (JP); Kohei Asada, Kanagawa (JP); Keiichi Osako, Tokyo (JP); Shigetoshi Hayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/506,858

(22) PCT Filed: Sep. 4, 2015

(86) PCT No.: PCT/JP2015/075160
§ 371 (c)(1),
(2) Date: Feb. 27, 2017

(87) PCT Pub. No.: WO2016/043062
PCT Pub. Date: Mar. 24, 2016

(65) Prior Publication Data
US 2018/0233124 A1      Aug. 16, 2018

(30) Foreign Application Priority Data

Sep. 17, 2014 (JP) .................................. 2014-188504

(51) Int. Cl.
*G10K 11/178*    (2006.01)
*B60R 11/02*    (2006.01)
(Continued)

(52) U.S. Cl.
CPC ........ *G10K 11/17823* (2018.01); *B60R 11/02* (2013.01); *G10K 11/178* (2013.01);
(Continued)

(58) Field of Classification Search
USPC .... 381/71.1, 71.8, 71.9, 71.11, 71.12, 71.14, 381/13, 94.8
See application file for complete search history.

(56) References Cited

U.S. PATENT DOCUMENTS 5,388,160 A    2/1995 Hashimoto et al.

FOREIGN PATENT DOCUMENTS

EP    0517525 A2    12/1992
EP    2472510 A1    7/2012
(Continued)

OTHER PUBLICATIONS

International Search Report and Written Opinion of PCT Application No. PCT/JP2015/075160, dated Nov. 24, 2015, 06 pages of English Translation and 06 pages of ISRWO.
(Continued)

*Primary Examiner* — Yosef K Laekemariam
(74) *Attorney, Agent, or Firm* — Chip Law Group

(57) ABSTRACT

The present disclosure relates to a noise reduction device and a noise reduction method capable of reducing noise in a more stable and effective manner. Signal processing is performed to generate a reference signal representing a waveform of noise. Moreover, signal processing is performed for an error signal representing a waveform of an error measured by a microphone in accordance with an amplitude-frequency characteristic. Then, a filter coefficient with which the error signal becomes zero is calculated under adaptive algorithm with reference to the reference signal. The reference signal is filtered by using the filter coefficient to obtain a control signal. The control signal is supplied to the corresponding one of the predetermined number of output units. The present technology is applicable to a noise cancelling system equipped in a closed space such as an interior of a vehicle, for example.

6 Claims, 13 Drawing Sheets

(51) Int. Cl.
  *H04R 5/02*    (2006.01)
  *H04M 9/08*    (2006.01)
(52) U.S. Cl.
  CPC ......... *G10K 11/17853* (2018.01); *H04M 9/08* (2013.01); *H04R 5/02* (2013.01); *H04R 2499/13* (2013.01)

(56) References Cited

FOREIGN PATENT DOCUMENTS

| | | | | | |
|---|---|---|---|---|---|
| JP | 06-332477 | A | 12/1994 | | |
| JP | H11259078 | * | 3/1998 | ............... | G01H 3/00 |
| JP | 11-259078 | A | 9/1999 | | |
| JP | 2005-084500 | A | 3/2005 | | |
| JP | 2011036742 | * | 9/2009 | ............... | F24F 11/02 |
| JP | 5474079 | B2 | 4/2014 | | |
| WO | 2011/036742 | A | 3/2011 | | |
| WO | 2011/036742 | A1 | 3/2011 | | |

OTHER PUBLICATIONS

International Preliminary Report on Patentability of PCT Application No. PCT/JP2015/075160, dated Mar. 30, 2017, 08 pages of English Translation and 04 pages of IPRP.
Extended European Search Report of EP Patent Application No. 1584869.8, dated Feb. 19, 2018, 08 pages.

* cited by examiner

MANY PEAKS OR DIPS ARE GENERATED IN CLOSED SPACE.
FIR FILTER DOES NOT NORMALLY FUNCTION WHEN C IS SET AS C' WITHOUT CHANGE.

NOISE REDUCTION DEVICE AND NOISE REDUCTION METHOD

CROSS REFERENCE TO RELATED APPLICATIONS

This application is a U.S. National Phase of International Patent Application No. PCT/JP2015/075160 filed on Sep. 4, 2015, which claims priority benefit of Japanese Patent Application No. JP 2014-188504 filed in the Japan Patent Office on Sep. 17, 2014. Each of the above-referenced applications is hereby incorporated herein by reference in its entirety.

TECHNICAL FIELD

The present disclosure relates to a noise reduction device, a noise reduction method, and a program, and more particularly to a noise reduction device, a noise reduction method, and a program capable of reducing noise in a more stable and effective manner.

BACKGROUND ART

There has been proposed a noise cancelling system which reduces noise by outputting a noise cancelling sound wave from a speaker.

For example, Patent Document 1 discloses an active vibration and noise reduction device which outputs noise cancelling sound waves from a plurality of speakers, and applies adaptive algorithm to each of a plurality of routes of the sound waves from the respective speakers to a microphone.

CITATION LIST

Patent Document

[Patent Document 1] Japanese Patent Application Laid-Open No. 2005-84500

SUMMARY OF THE INVENTION

Problems to be Solved by the Invention

According to the conventional noise cancelling system, however, dips generated in the routes from the plurality of speakers to the microphone in a closed space, such as an interior of a vehicle, are difficult to cancel depending on positions of the speakers and the microphone. According to the configuration disclosed in foregoing Patent Document 1, for example, a dip generated in any one of the routes may adversely affect the adaptive algorithm even in the presence of the plurality of routes. In this case, stable noise reduction is difficult to achieve.

The present disclosure developed in consideration of the aforementioned circumstances reduces noise in a more stable and effective manner.

Solutions to Problems

A noise reduction device according to an aspect of the present disclosure includes: a reference signal processing unit that performs signal processing for generating a reference signal representing a waveform of noise corresponding to a reduction control target on the basis of an estimation value indicating estimation of an acoustic characteristic in a route from an output unit to an error measurement unit, the error measurement unit measuring an error corresponding to a waveform of a synthetic wave produced by synthesizing the noise, and a sound wave output from the output unit to cancel the noise; an error signal processing unit that performs signal processing for an error signal representing a waveform of the error measured by the error measurement unit, in accordance with an amplitude-frequency characteristic obtained from the acoustic characteristic; a filter coefficient calculation unit that calculates a filter coefficient with which the error signal becomes zero under adaptive algorithm with reference to the reference signal; and a filter unit that filters the reference signal by using the filter coefficient calculated by the filter coefficient calculation unit to obtain a control signal, and supplies the control signal to the output unit. The reference signal processing unit, the error signal processing unit, the filter coefficient calculation unit, and the filter unit are provided for each of a predetermined number of the output units.

A noise reduction method or a program according to an aspect of the present disclosure includes steps of: performing signal processing for generating a reference signal representing a waveform of noise corresponding to a reduction control target on the basis of an estimation value indicating estimation of an acoustic characteristic in a route from an output unit to an error measurement unit, the error measurement unit measuring an error corresponding to a waveform of a synthetic wave produced by synthesizing the noise, and a sound wave output from the output unit to cancel the noise; performing signal processing for an error signal representing a waveform of the error measured by the error measurement unit, in accordance with an amplitude-frequency characteristic obtained from the acoustic characteristic; calculating a filter coefficient with which the error signal becomes zero under adaptive algorithm with reference to the reference signal; and filtering the reference signal by using the filter coefficient to obtain a control signal, and supplying the control signal to the output unit. The signal processing for generating the reference signal, the signal processing for the error signal, the calculation of the filter coefficient, and the filtering of the reference signal are performed for each of a predetermined number of the output units.

According to an aspect of the present disclosure, signal processing is performed to generate a reference signal representing a waveform of noise corresponding to a reduction control target on the basis of an estimation value indicating estimation of an acoustic characteristic in a route from an output unit to an error measurement unit. In this case, the error measurement unit measures an error corresponding to a waveform of a synthetic wave produced by synthesizing the noise, and a sound wave output from the output unit to cancel the noise. Moreover, signal processing for an error signal representing a waveform of the error measured by the error measurement unit is performed. In this case, the signal processing for the error signal is performed in accordance with an amplitude-frequency characteristic obtained from the acoustic characteristic. Furthermore, a filter coefficient with which the error signal becomes zero is calculated under adaptive algorithm with reference to the reference signal. The reference signal is filtered by using the filter coefficient to obtain a control signal, and supplied the control signal to the output unit. In this case, the signal processing for generating the reference signal, the signal processing for the error signal, the calculation of the filter coefficient, and the filtering of the reference signal are performed for each of a predetermined number of the output units.

Effects of the Invention

According to an aspect of the present disclosure, more stable and effective noise reduction is achievable.

MODE FOR CARRYING OUT THE INVENTION

Specific embodiments to which the present technology has been applied are hereinafter described in detail with reference to the drawings.

A conventional adaptive filter is initially described with reference to FIGS. 1 through 3.

Figure 1A:
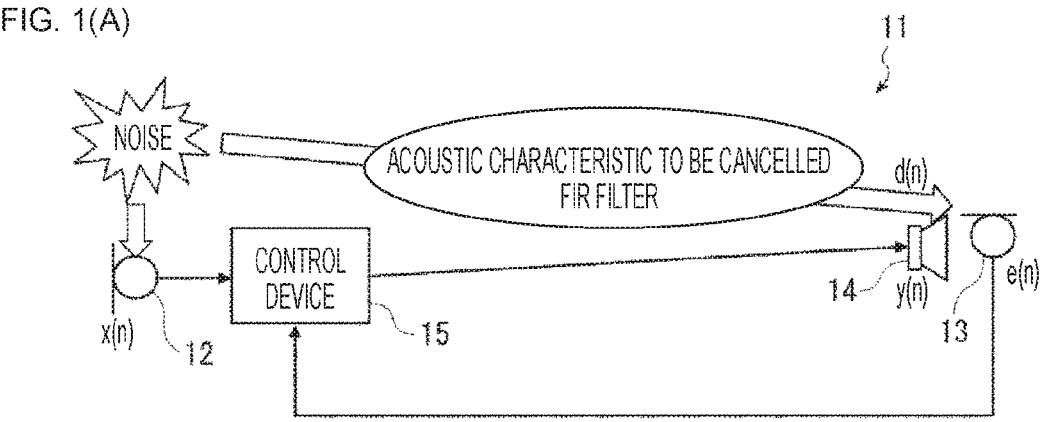
FIGS. 1(A) and 1(B) are a view illustrating an example of a basic adaptive filter.
Figure 1B:
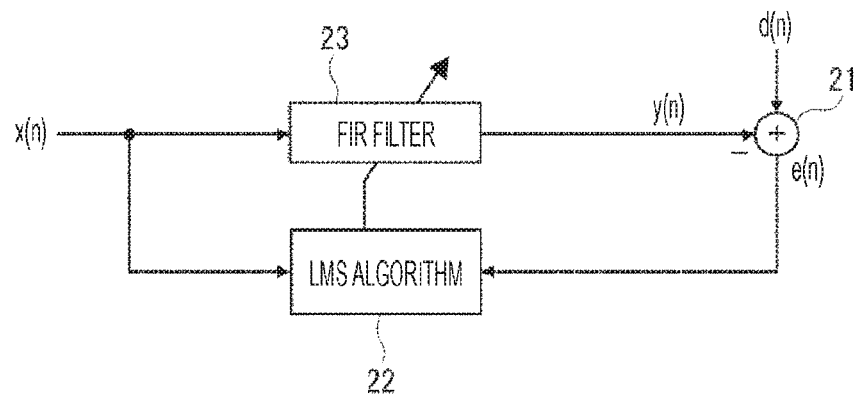

FIG. 1(A) and FIG. 1(B) are a view illustrating an example of a basic adaptive filter. FIG. 1(A) is a block diagram illustrating a configuration example of a noise cancelling system, while FIG. 1(B) is a block diagram illustrating signal transmission in the noise cancelling system. Note that the system in the present specification represents a whole apparatus constituted by a plurality of devices.

As illustrated in FIG. 1(A), a noise cancelling system 11 includes microphones 12 and 13, a speaker 14, and a control device 15.

The microphone 12 is a noise measurement unit which measures noise entering from the outside in real time. The microphone 12 supplies an electric signal representing a waveform of measured noise to the control device 15 as a reference signal x(n).

The microphone 13 is an error measurement unit which measures, as an error of noise cancelling control, a synthetic wave in real time produced by synthesizing noise corresponding to a reduction control target, and a noise cancelling sound wave output from the speaker 14. The microphone 13 subsequently supplies an electric signal representing a waveform of the synthetic wave to the control device 15 as an error signal e(n). More specifically, the microphone 13 functions as an adder 21 which receives a control target signal d(n) representing a waveform of the noise corresponding to the reduction control target, and a control signal y(n) achieving reduction control of the noise as illustrated in FIG. 1(B). Then, the microphone 13 having received the respective signals d(n) and y(n) calculates an error signal e(n) indicating a cancellation between the control target signal d(n) and the control signal y(n), i.e., the error signal e(n) obtained by subtracting the control signal y(n) from the control target signal d(n), and supplies the calculated error signal e(n) to the control device 15.

The speaker 14 is an output unit which outputs a sound wave having a waveform corresponding to the control signal y(n) supplied from the control device 15.

The control device 15 generates the control signal y(n) on the basis of the reference signal x(n) received from the microphone 12 and the error signal e(n) received from the microphone 13, and supplies the control signal y(n) to the speaker 14. More specifically, the control device 15 includes a least mean square (LMS) algorithm block 22 and a finite impulse response (FIR) filter block 23 as illustrated in FIG. 1(B). The LMS algorithm block 22 generates a filter coefficient with which the error signal e(n) becomes zero for the FIR filter block 23 in real time under the adaptive algorithm with reference to the reference signal x(n). The LMS algorithm block 22 supplies the generated filter coefficient to the FIR filter block 23. The FIR filter block 23 filters the reference signal x(n) by using the filter coefficient supplied from the LMS algorithm block 22 to generate the control signal y(n), and outputs the generated control signal y(n).

According to the noise cancelling system 11 having this configuration, the filter coefficient used by the FIR filter block 23 for filtering is updated in real time by the LMS algorithm block 22 under the adaptive algorithm. Accordingly, the noise cancelling system 11 is capable of outputting a noise cancelling sound wave from the speaker 14 to achieve noise reduction.

Incidentally, when viewed in FIGS. 1(A) and 1(B), the speaker 14 of the noise cancelling system 11 is disposed at a position in the vicinity of the microphone 13 corresponding to a control position. However, a certain distance is left from the speaker 14 to the control position in an actual situation. Accordingly, stability of a filter increases when consideration is given to an acoustic characteristic C exhibited in a transmission route from the speaker 14 to the microphone 13.

Figure 2A:
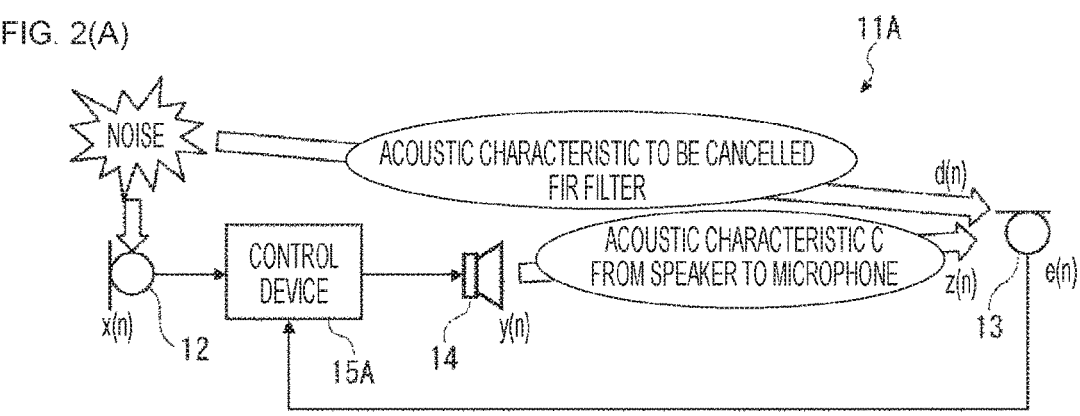
FIGS. 2(A) and 2(B) are a view illustrating an example of an adaptive filter considering an acoustic characteristic.
Figure 2B:
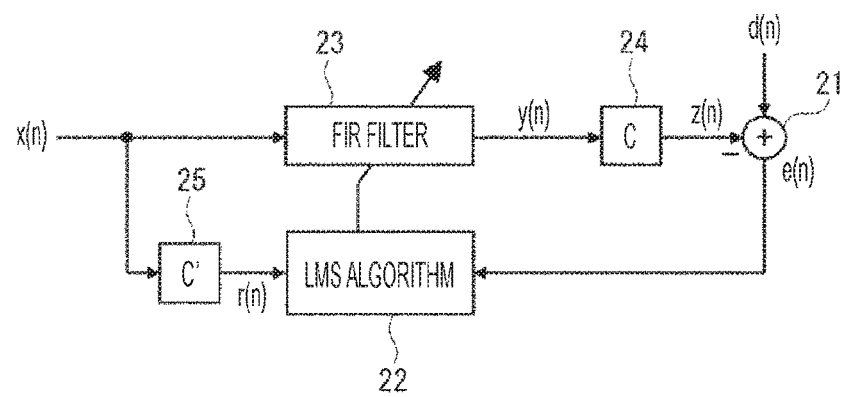

FIGS. 2(A) and 2(B) referred to next is a view illustrating an example of an adaptive filter provided in consideration of an acoustic characteristic. FIG. 2(A) is a block diagram illustrating a configuration example of a noise cancelling system, while FIG. 2(B) is a block diagram illustrating signal transmission in the noise cancelling system.

According to a noise cancelling system 11A illustrated in FIGS. 2(A) and 2(B), a transmission route provided from the speaker 14 to the microphone 13 contains a filter block 24 setting a filter coefficient to the acoustic characteristic C between the FIR filter block 23 and the adder 21 as illustrated in FIG. 2(B). The noise cancelling system 11A having this configuration calculates an estimation value C' which indicates estimation of the acoustic characteristic C by measurement, and provides an estimation filter block 25 which sets a filter coefficient to the calculated estimation value C' on the upstream side of the LMS algorithm block 22.

More specifically, the control device 15 includes the estimation filter block 25 in addition to the LMS algorithm block 22 and the FIR filter block 23. In this case, the estimation filter block 25 supplies, to the LMS algorithm block 22, a filtering reference signal r(n) generated by filtering the reference signal x(n) using the estimation value C' as a filter coefficient.

The noise cancelling system 11A is therefore capable of cancelling noise in a stable manner in consideration of the acoustic characteristic C in the transmission route from the speaker 14 to the microphone 13. The method which adds the estimation filter block 25 on the upstream side of the LMS algorithm block 22 in this manner is called Filtered-X.

Figure 3A:
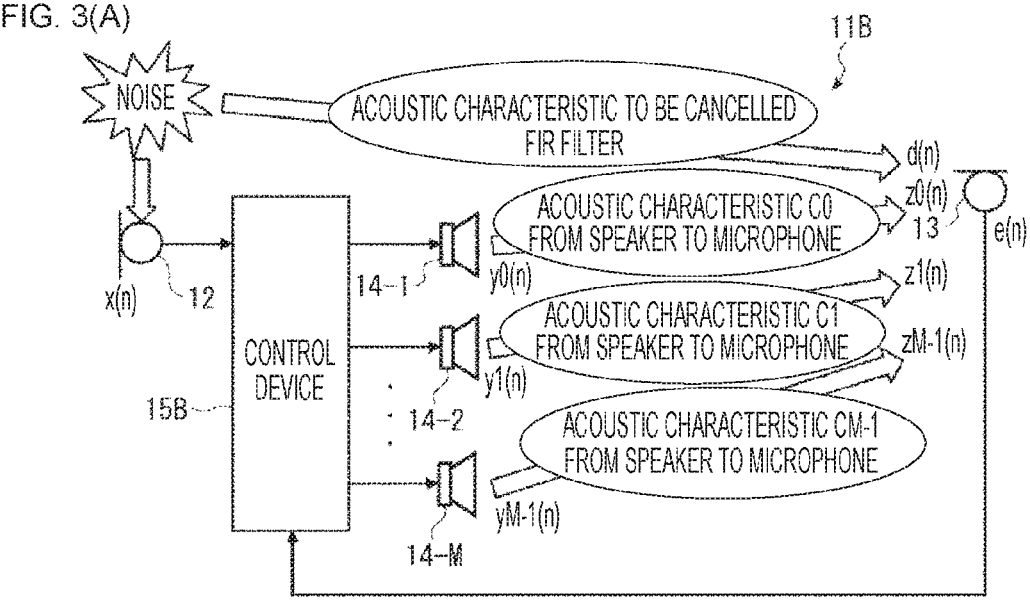
FIGS. 3(A) and 3(B) are a view illustrating an example of an adaptive filter in a configuration including a plurality of speakers.
Figure 3B:
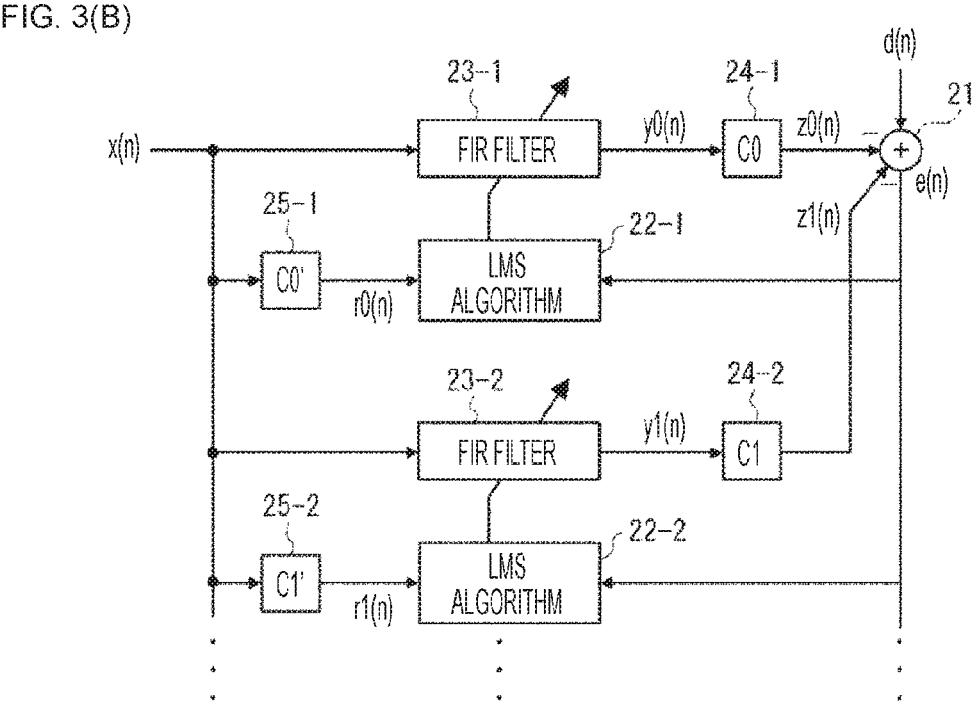

FIGS. 3(A) and 3(B) referred to next is a view illustrating an example of an adaptive filter in a configuration including a plurality of speakers. FIG. 3(A) is a block diagram illustrating a configuration example of a noise cancelling system including a plurality of speakers, while FIG. 3(B) is a block diagram illustrating signal transmission in the noise cancelling system including the plurality of speakers.

As illustrated in FIG. 3(A), a noise cancelling system 11B includes the microphones 12 and 13, M speakers 14-1 through 14-M, and a control device 15B.

In this way, according to the noise cancelling system 11B including the M speakers 14-1 through 14-M, FIR filter blocks 23-1 through 23-M of the control device 15B are provided for the M speakers 14-1 through 14-M, respectively. In this case, the filter coefficient is updated in real time for each of the FIR filter blocks 23-1 through 23-M by LMS algorithm blocks 22-1 through 22-M, respectively.

Accordingly, the noise cancelling system 11B is capable of generating control signals y0(n) through yM-1(n) for the corresponding speakers 14-1 through 14-M in consideration of acoustic characteristics C0 through CM-1 to achieve effective noise cancellation.

Discussed hereinbelow is an application example of the noise cancelling system 11B including the plurality of speakers 14 in a state equipped in a closed space such as an interior of a vehicle.

Figure 4:
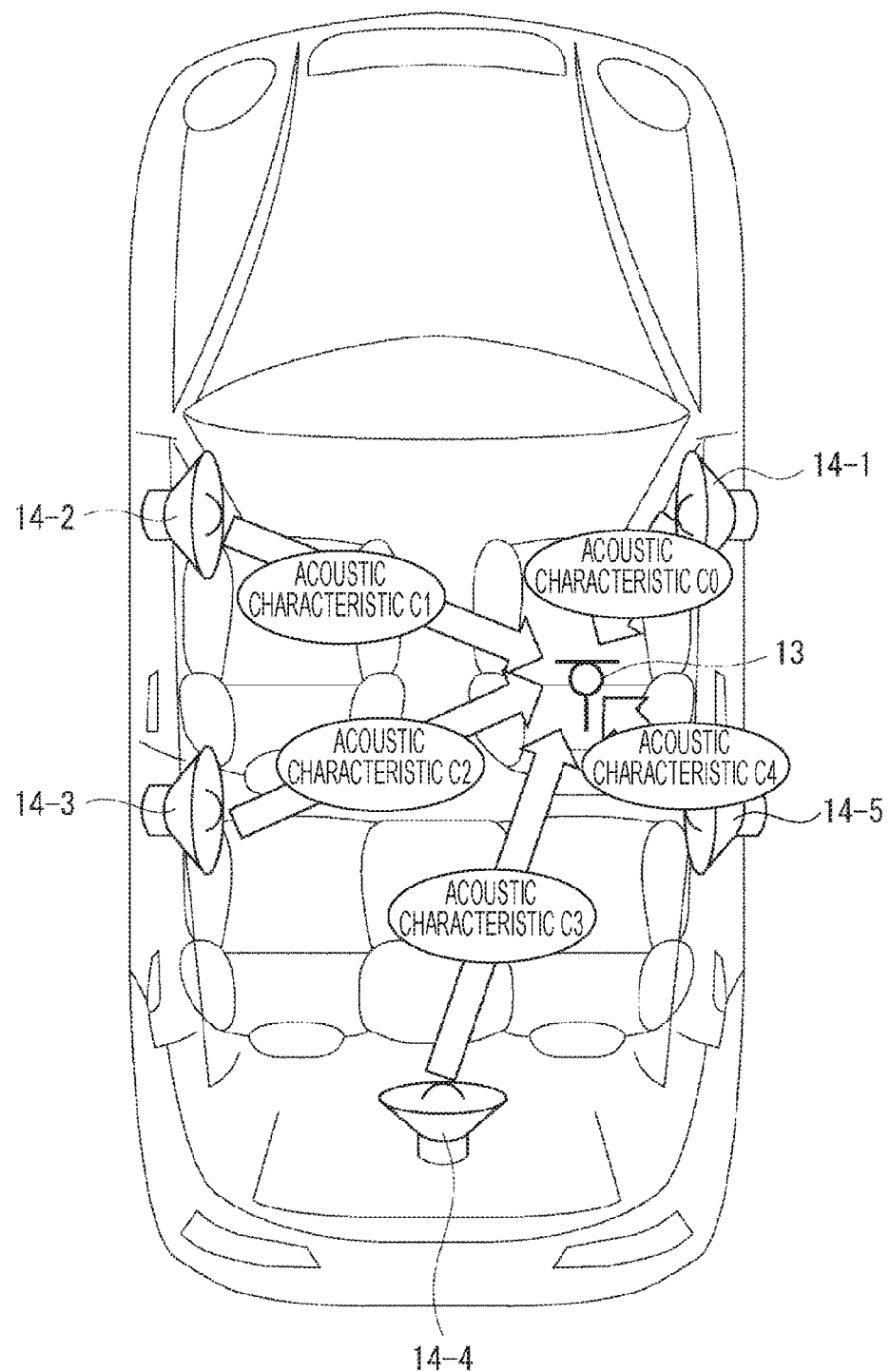
FIG. 4 is a view illustrating an example of a noise cancelling system equipped in an interior space of a vehicle.

FIG. 4 illustrates an example of the noise cancelling system 11B equipped in a vehicle interior space. In this example, the five speakers 14-1 through 14-5 are disposed on a body of the vehicle, while the microphone 13 is disposed on a seat on which a driver sits.

According to the noise cancelling system 11B having this configuration, it is estimated that a large number of peaks or dips (vertexes corresponding to tops or bottoms) are generated on a frequency axis by an effect of a standing wave in the interior of the vehicle forming a closed space, for example. When the acoustic characteristic C containing the large number of peaks or dips is measured and used without change, it is highly probable that the characteristic supplied to each of the FIR filter blocks 23 becomes extremely unnatural with a need for correction of the peaks or dips. This situation is generally overcome by changing the acoustic characteristic C to a natural characteristic. However, this change causes convergence of an original characteristic of each of the FIR filter blocks 23 to a different characteristic, in which condition stable reduction of noise becomes difficult.

Accordingly, it is proposed in this embodiment to provide a band-limiting filter for each peak or dip for removal of the corresponding peak or dip of the acoustic characteristic C, and input the band-limited error signal e(n) to the LMS algorithm block 22.

The acoustic characteristics and the band-limiting filters are hereinafter described with reference to FIG. 5.

Figure 5:
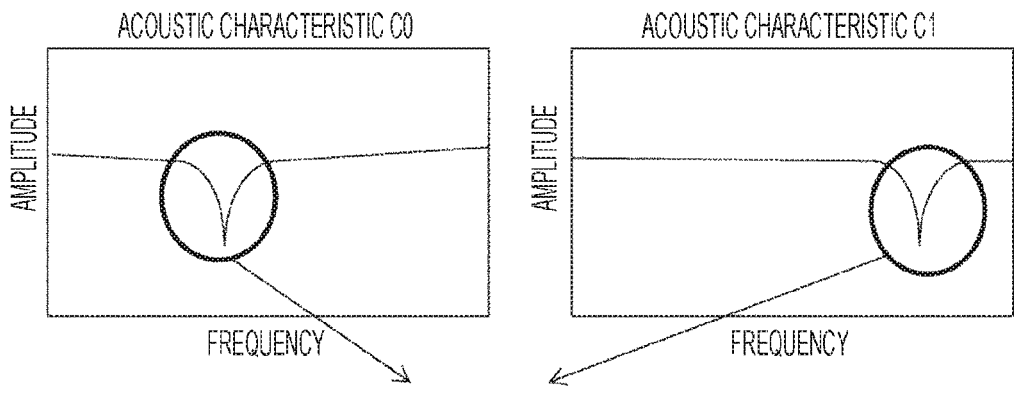
FIG. 5 is a view illustrating acoustic characteristics and band-limiting filters.
Figure 5:
Figure 5:
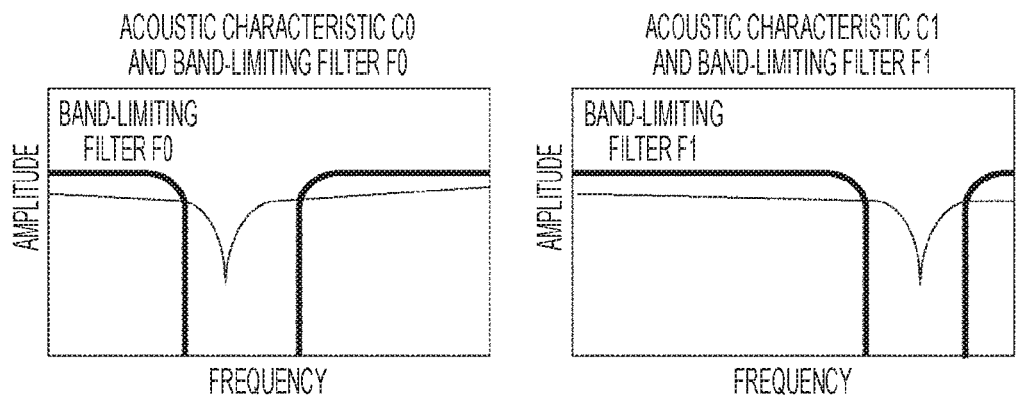

As illustrated in an upper part in FIG. 5, dips are generated at different frequencies for the acoustic characteristic C0 and the acoustic characteristic C1, respectively. There are generated a number of peaks or dips particularly in a closed space. It is therefore estimated that the FIR filter blocks 23 do not function in the normal condition with filter coefficients generated by the corresponding LMS algorithm blocks 22 on the basis of the acoustic characteristics C0 and C1 in this state.

Accordingly, a band-limiting filter F0 for limiting a frequency band containing the dip in the acoustic characteristic C0, and a band-limiting filter F1 for limiting a frequency band containing the dip in the acoustic characteristic C1 are provided as illustrated in a lower part in FIG. 5. As described above, it is proposed herein to produce a band-limiting filter F for each, and input the band-limited error signal e(n) to the corresponding LMS algorithm block 22.

This method prohibits filtering by the FIR filter blocks 23 at frequencies out of specialty, and performs filtering by the FIR filter blocks 23 at frequencies of specialty in the respective routes. It is assumed that a frequency out of specialty is different for each route. Compensation for noise cancelling at a frequency out of specialty in a route is therefore achievable by noise canceling at a frequency of specialty in a different route.

Figure 6:
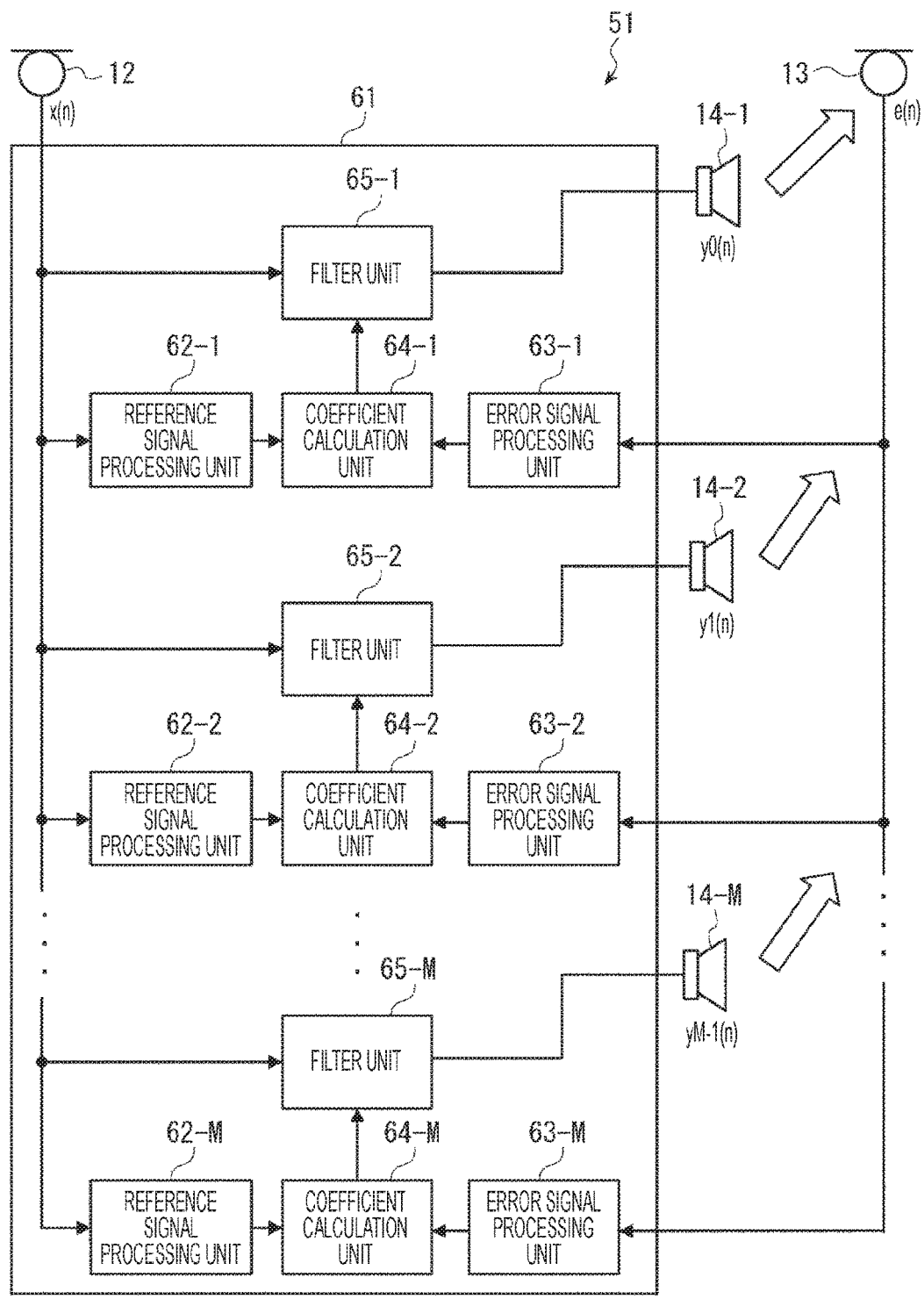
FIG. 6 is a block diagram illustrating a configuration example of a noise cancelling system according to a first embodiment to which the present technology has been applied.
Figure 7:
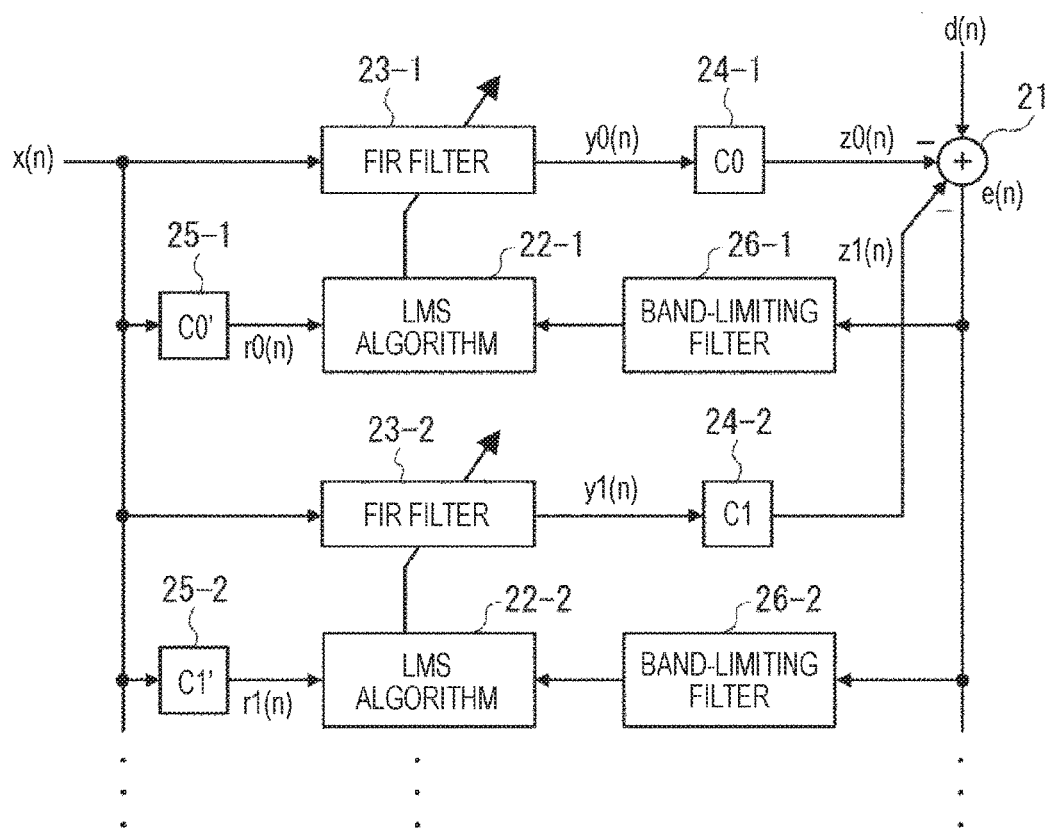
FIG. 7 is a block diagram illustrating signal transmission in the noise cancelling system illustrated in FIG. 6.

A noise cancelling system according to a first embodiment to which the present technology has been applied is hereinafter described with reference to FIGS. 6 and 7. FIG. 6 is a block diagram illustrating a configuration example of the noise cancelling system, while FIG. 7 is a block diagram illustrating signal transmission in the noise cancelling system. Note that blocks common to the configuration illustrated in FIGS. 3(A) and 3(B) and the configuration illustrated in FIGS. 6 and 7 have been given common reference numbers. Detailed explanation of these common blocks is not repeated herein.

As illustrated in FIG. 6, a noise cancelling system 51 includes the microphones 12 and 13, the M speakers 14-1 through 14-M, and a control device 61.

The microphone 12 is a noise measurement unit which measures noise corresponding to a reduction control target in real time. The microphone 12 supplies an electric signal representing a waveform of measured noise to the control device 61 as the reference signal x(n).

The microphone 13 is an error measurement unit which measures, as an error of noise cancelling control, a synthetic wave in real time produced by synthesizing noise corresponding to a reduction control target, and a plurality of sound waves output from the speakers 14-1 through 14-M. The microphone 13 subsequently supplies an electric signal representing a waveform of the synthetic wave to the control device 61 as the error signal e(n).

Each of the speakers 14-1 through 14-M is an output unit which outputs a sound wave having a waveform of the corresponding one of the control signals y0(n) through yM-1(n) supplied from the control device 61. In addition, each of the sound waves output from the speakers 14-1 through 14-M is changed in accordance with the corresponding one of the acoustic characteristics C0 through CM exhibited from the speakers 14-1 through 14-M to the microphone 13, and is measured by the microphone 13.

The control device 61 filters the reference signal x(n) received from the microphone 12 in accordance with the error signal e(n) received from the microphone 13 for each of the speakers 14-1 through 14-M to obtain control signals y0(n) through yM-1(n), and supplies the control signals y0(n) through yM-1(n) to speakers 14-1 through 14-M, respectively.

More specifically, the control device 61 includes M reference signal processing units 62-1 through 62-M, M error signal processing units 63-1 through 63-M, M coefficient calculation units 64-1 through 64-M, and M filter units 65-1 through 65-M. Note that respective configurations of the reference signal processing units 62-1 through 62-M, respective configurations of the error signal processing units 63-1 through 63-M, respective configurations of the coefficient calculation units 64-1 through 64-M, and respective configurations of the filter units 65-1 through 65-M have similar configurations as reference signal processing units, error signal processing units, coefficient calculation units, and filter units, respectively. Accordingly, the individual units are hereinafter collectively referred to as reference signal processing units 62, error signal processing units 63, coefficient calculation units 64, and filter units 65 when distinction between the individual units is not necessary. Furthermore, the speakers 14-1 through 14-M are referred to as speakers 14 similarly.

The estimation value C' corresponding to estimation of the acoustic characteristic C exhibited from the corresponding speaker 14 to the microphone 13 is measured beforehand, and given to the corresponding reference signal processing unit 62 as a filter coefficient. Then, each of the reference signal processing unit 62 generates a filtering reference signal r(n) by filtering the reference signal x(n) received from the microphone 12 in accordance with the estimation value C', and supplies the filtering reference signal r(n) to the reference signal processing unit 62.

Each of the error signal processing units 63 performs signal processing for the error signal e(n) received from the microphone 13 in accordance with an amplitude-frequency characteristic obtained from the acoustic characteristic C exhibited from the corresponding speaker 14 to the microphone 13 which is measured beforehand, and supplies the error signal e(n) subjected to signal processing to the corresponding coefficient calculation unit 64. For example, the error signal processing unit 63 functioning as a band-limiting filter block 26 as illustrated in FIG. 7 performs band-limiting filtration for the error signal e(n) to cut peaks or dips in accordance with the amplitude-frequency characteristic, and supplies the band-limited error signal e(n) to the corresponding coefficient calculation unit 64.

Each of the coefficient calculation units 64 generates a filter coefficient with which the error signal e(n) band-limited by the error signal processing unit 63 becomes zero for the corresponding filter unit 65 in real time under adaptive algorithm with reference to the filtering reference signal r(n) received from the reference signal processing unit 62. Thereafter, the coefficient calculation unit 64 supplies the generated filter coefficient to the corresponding filter unit 65.

Each of the filter units 65 filters the reference signal x(n) by using the filter coefficient received from the coefficient calculation unit 64 to generate the control signal y(n), and outputs the generated control signal y(n) to the corresponding speaker 14.

According to the noise cancelling system 51 having this configuration, the respective error signal processing units 63 may cut peaks or dips in the manner described with reference to FIG. 5 on the basis of the amplitude-frequency characteristics of the acoustic characteristics C0 through CM-1 measured beforehand for each of the plurality of routes. The band-limited error signal e(n) corresponding to each of the peaks or dips is then supplied to the corresponding coefficient calculation unit 64 to generate the filter coefficient. Accordingly, more stable and effective noise reduction is achievable.

More specifically, different routes are provided from the plurality of speakers 14 to the microphone 13, wherefore respective dips and peaks are generated in different frequency bands on the frequency axis. The respective peaks or dips generated as described above are filtered by the error signal processing units 63-1 through 63-M in such a manner as to limit the bands of the peaks or dips. In this case, the respective filter coefficients based on the error signals e(n) at the corresponding frequencies are not determined by the filter units 65-1 through 65-M, but allowed to obtain slewing characteristics. Accordingly, stability increases in comparison with a configuration not limiting the band for each filter group.

Moreover, when the frequency subjected to band limitation is identical for each route, the corresponding band is not filtered. However, when the frequency subjected to band limitation is different for each of different routes, mutual compensation is realizable accordingly. Filtering for all frequencies is therefore achievable.

Note that the reference signal x(n) which indicates noise corresponding to a reduction control target may be measured by a sensor capable of detecting vibration of the vehicle, for example, in place of the microphone 12.

Figure 8:
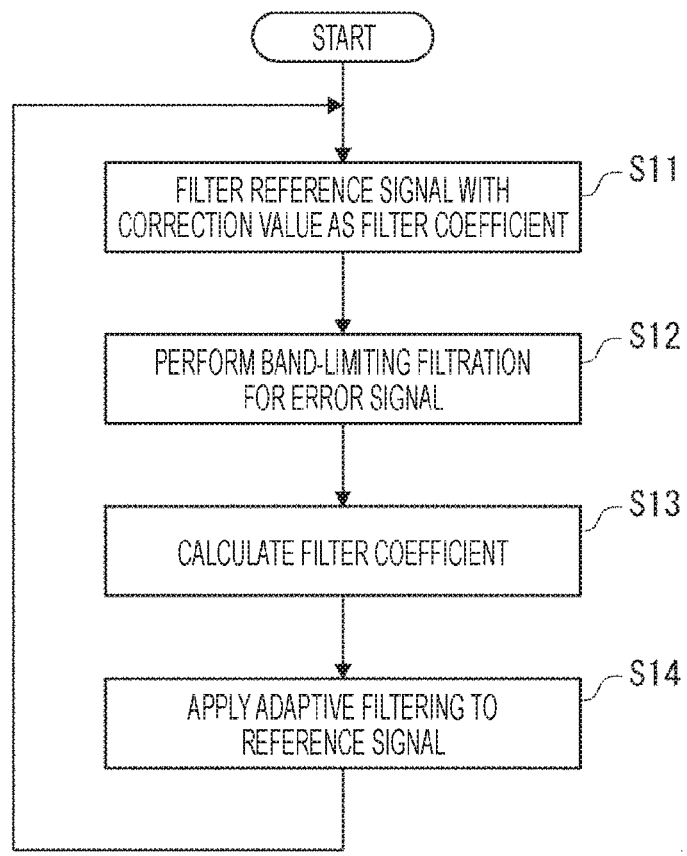
FIG. 8 is a flowchart showing a noise reduction process.

A noise reduction process performed by the control device 61 is hereinafter described with reference to a flowchart shown in FIG. 8.

For example, the process starts in response to a start of supply of the reference signal x(n) from the microphone 12, and a start of supply of the error signal e(n) from the microphone 13. In step S11, the reference signal processing unit 62 generates the filtering reference signal r(n) by filtering the reference signal x(n) using the acoustic characteristic C measured beforehand as the estimation value C', and supplies the generated filtering reference signal r(n) to the reference signal processing unit 62.

In step S12, the error signal processing unit 63 performs band-limiting filtration for the error signal e(n) to cut peaks or dips in accordance with an amplitude-frequency characteristic obtained from the acoustic characteristic C. The error signal processing unit 63 supplies the band-limited error signal e(n) to the coefficient calculation unit 64.

In step S13, the coefficient calculation unit 64 calculates a filter coefficient with which the error signal e(n) band-limited and supplied from the error signal processing unit 63 in step S12 becomes zero under adaptive algorithm with reference to the filtering reference signal r(n) supplied from the reference signal processing unit 62 in step S11. Thereafter, the coefficient calculation unit 64 supplies the calculated filter coefficient to the filter unit 65 for update.

In step S14, the filter unit 65 generates the control signal y(n) by filtering the reference signal x(n) with the filter coefficient supplied from the coefficient calculation unit 64 in step S113, and outputs the generated control signal y(n) to the speaker 14. As a result, a sound wave corresponding to the control signal y(n) is output from the speaker 14, whereby noise measured by the microphone 13 is cancelled.

After completion of processing in step S14, the process returns to step S11 to repeat processing in a similar manner.

As described above, the control device 61 calculates the filter coefficient using the error signal e(n) whose frequency band is limited to a band containing a generated peak or dip. Accordingly, the noise reduction process can reduce noise in a more stable and effective manner.

Figure 9:
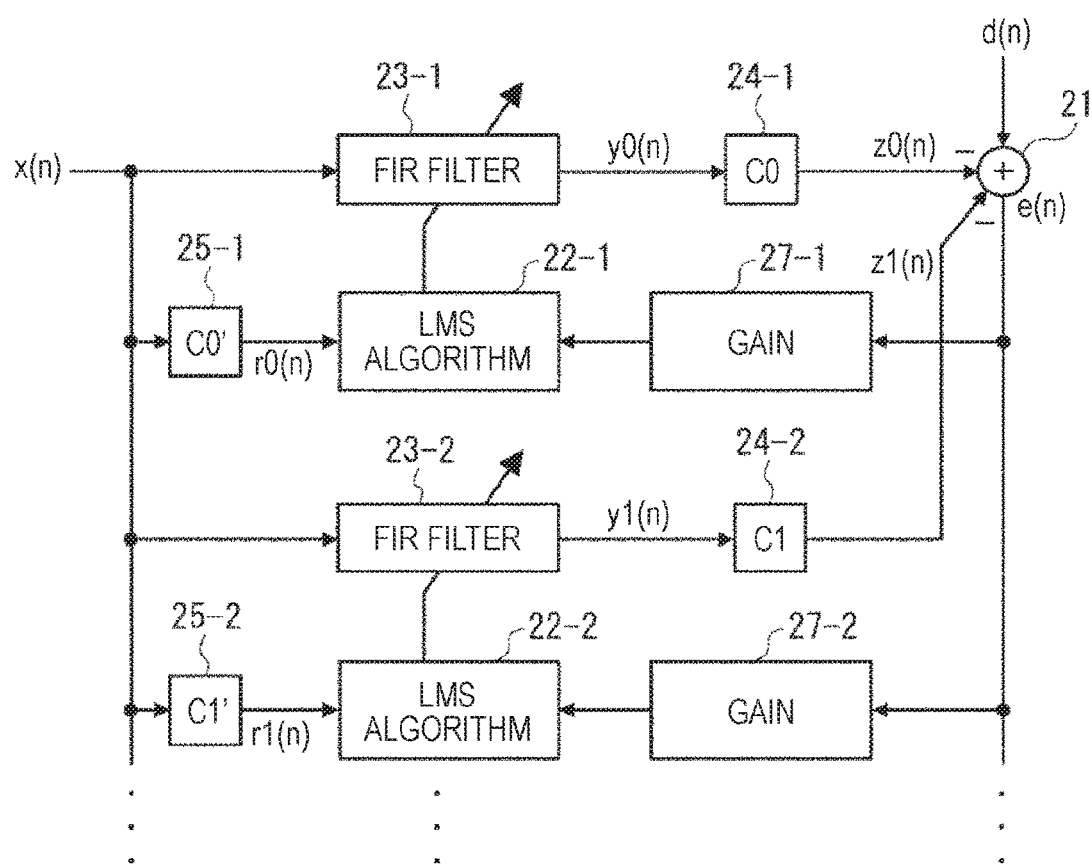
FIG. 9 is a block diagram illustrating a modified example of the noise cancelling system illustrated in FIG. 6.

FIG. 9 is a block diagram illustrating a modified example of the noise cancelling system in FIG. 6.

According to the noise cancelling system 51 illustrated in FIG. 9, each of the error signal processing units 63 of the control device 61 functions as a gain block 27. More specifically, the gain block 27 is provided in place of the band-limiting filter block 26 illustrated in FIG. 7. In this case, the error signal processing unit 63 performs signal processing for the error signal e(n) supplied from the microphone 13 by gain control which decreases a gain in a route containing a large peak or dip, and increases a gain in a route containing a small peak or dip in accordance with an amplitude frequency characteristic.

According to the noise cancelling system 51 having this configuration, the FIR filter block 23 in a group containing a smaller peak or dip becomes more stable. In this case, a proportion of error signals of the more stable FIR filter blocks 23 becomes larger than a proportion of error signals of the less stable FIR filter blocks 23. Accordingly, stability of the groups included in the noise cancelling system 51 improves as a whole.

As described above, more stable and effective noise reduction is achievable by providing the gain block 27 in the noise cancelling system 51 when the band-limiting filter block 26 is difficult to provide for a reason of implementation constraint, for example. This example is effective in a configuration given a smaller volume of resources for signal processing in comparison with the configuration including the band-limiting filter block 26.

Figure 10:
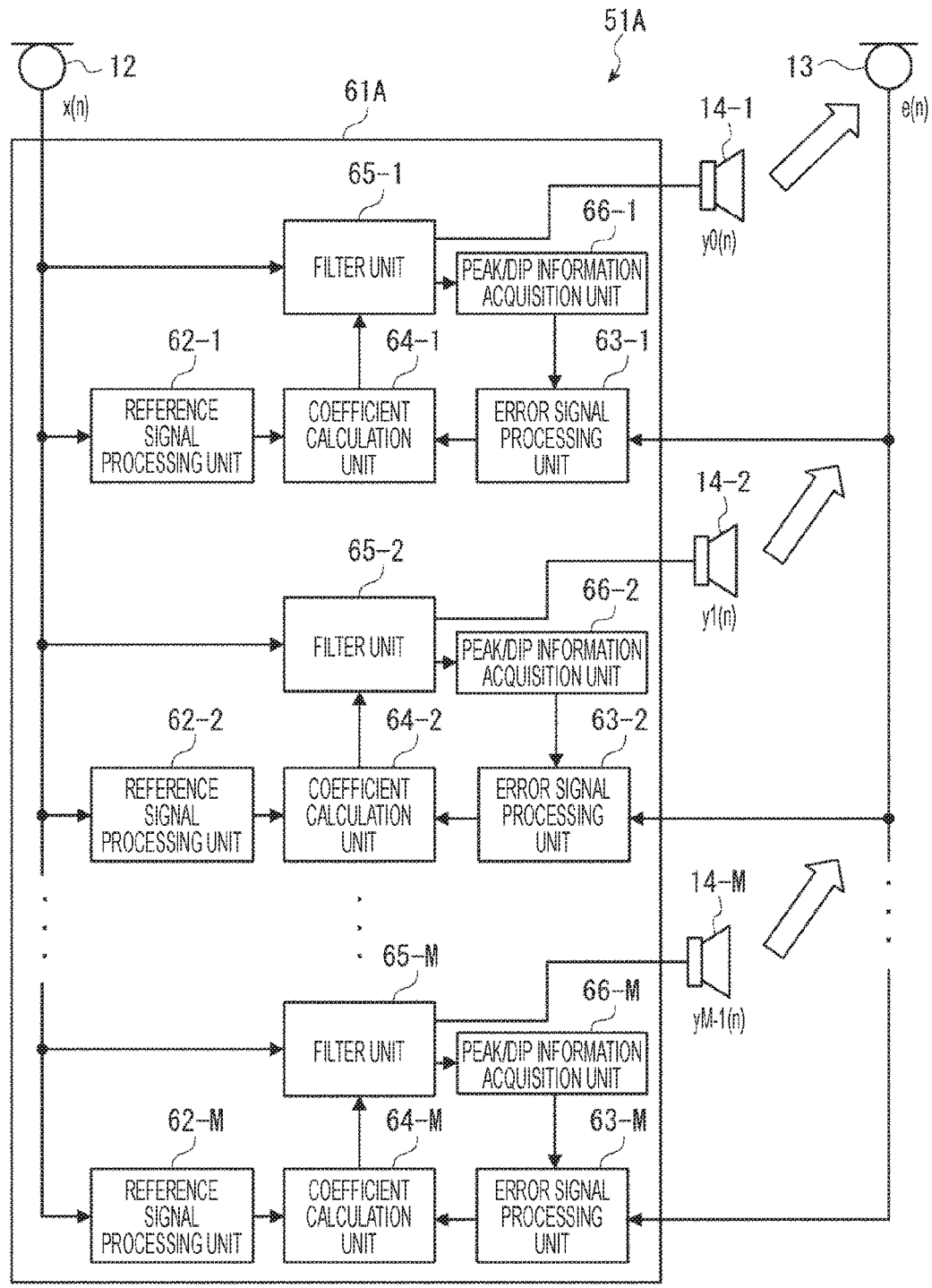
FIG. 10 is a block diagram illustrating a configuration example of a noise cancelling system according to a second embodiment to which the present technology has been applied.

A noise cancelling system according to a second embodiment to which the present technology has been applied is hereinafter described with reference to FIGS. 10 and 11. FIG. 10 is a block diagram illustrating a configuration example of the noise cancelling system, while FIG. 11 is a block diagram illustrating signal transmission in this noise cancelling system.

Figure 11:
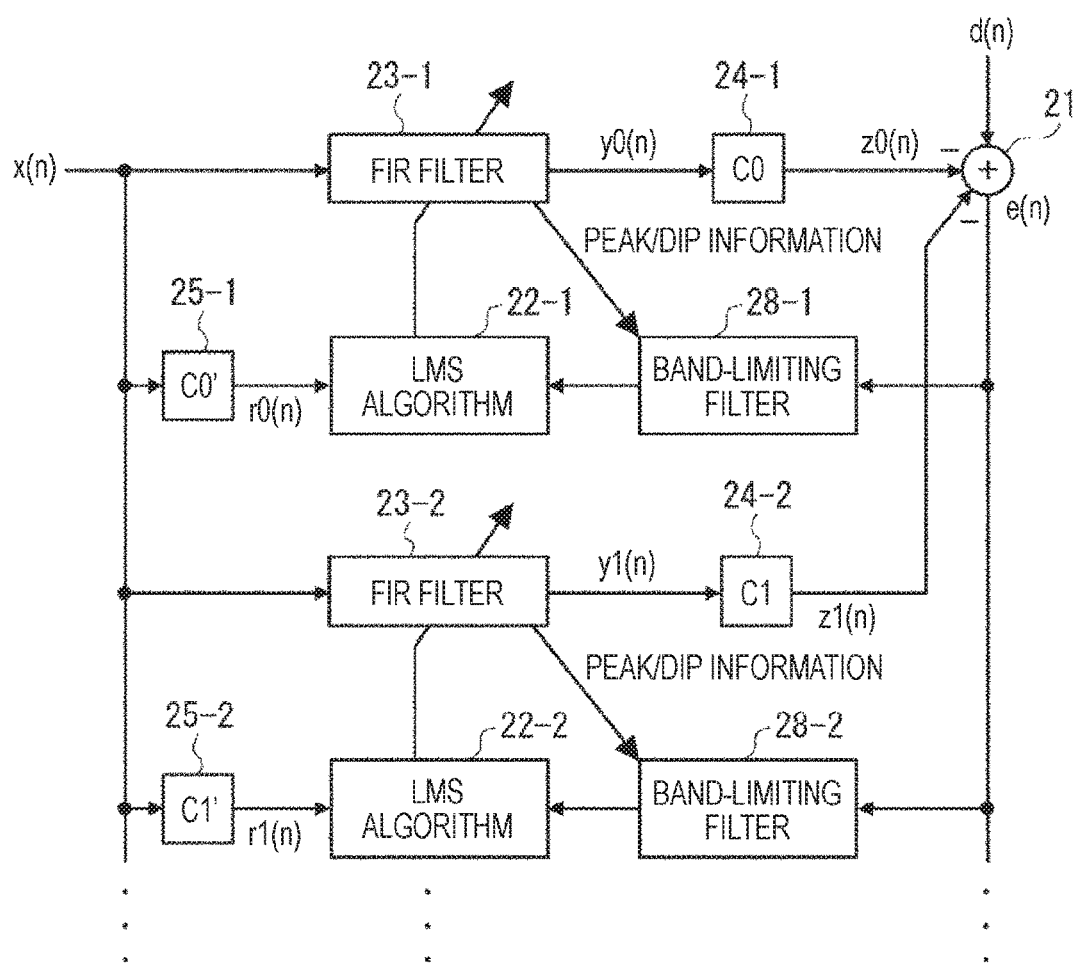
FIG. 11 is a block diagram illustrating signal transmission in the noise cancelling system illustrated in FIG. 10.

Note that blocks common to the noise cancelling system 51 illustrated in FIGS. 6 and 7 and a noise cancelling system 51A illustrated in FIGS. 10 and 11 have been given common reference numbers. Detailed explanation of these blocks is not repeated herein.

More specifically, the noise cancelling system 51A is similar to the noise cancelling system 51 illustrated in FIG. 6 in that the microphones 12 and 13, and the M speakers 14-1 through 14-M are provided, and is different from the noise cancelling system 51 in that a control device 61A having different configuration is provided. In addition, the control device 61A is similar to the control device 61 illustrated in FIG. 6 in that the M reference signal processing units 62-1 through 62-M, the M error signal processing units 63-1 through 63-M, the M coefficient calculation units 64-1 through 64-M, and the M filter units 65-1 through 65-M are provided. The control device 61A further includes M peak/dip information acquisition units 66-1 through 66-M in addition to these components.

Each of the peak/dip information acquisition units 66 measures a peak or dip of the corresponding filter unit 65 on the basis of fast Fourier transform (FFT) analysis performed for the corresponding filter unit 65 in real time to acquire peak/dip information. Thereafter, the peak/dip information acquisition unit 66 dynamically changes a frequency band for band limitation performed by the error signal processing unit 63 on the basis of the acquired peak/dip information. For example, the error signal processing unit 63 controls a cutoff frequency (fc) and a gain by using a parametric equalizer or the like to dynamically produce a band-limiting filter block 28.

According to the noise cancelling system 51 illustrated in FIG. 6, for example, accurate measurement of the acoustic characteristic C is needed to produce the band-limiting filter block 26. However, in case of implementation on vehicles, individual measurement for all types of vehicles is difficult to practice, for example. Moreover, even when the acoustic characteristic C is measured beforehand, it is estimated that the acoustic characteristic C changes in accordance with a passenger situation on a vehicle and a change of a vehicle with an elapse of time.

According to the noise cancelling system 51A, however, the peak/dip information acquisition unit 66 calculates a peak or dip on the basis of frequency information or the like obtained by fast Fourier transform analysis for the filter coefficient of the filter unit 65, based on which information the error signal processing unit 63 performs dynamical band limitation. Accordingly, while the noise cancelling system 51 illustrated in FIG. 6 requires accurate measurement of the acoustic characteristic C, the noise cancelling system 51A eliminates the necessity of accurate measurement of the acoustic characteristic C. Moreover, the noise cancelling system 51A is easily adaptable to transitions of the acoustic characteristic C produced by a change of a passenger situation on a vehicle and a change of a vehicle with an elapse of time.

Figure 12:
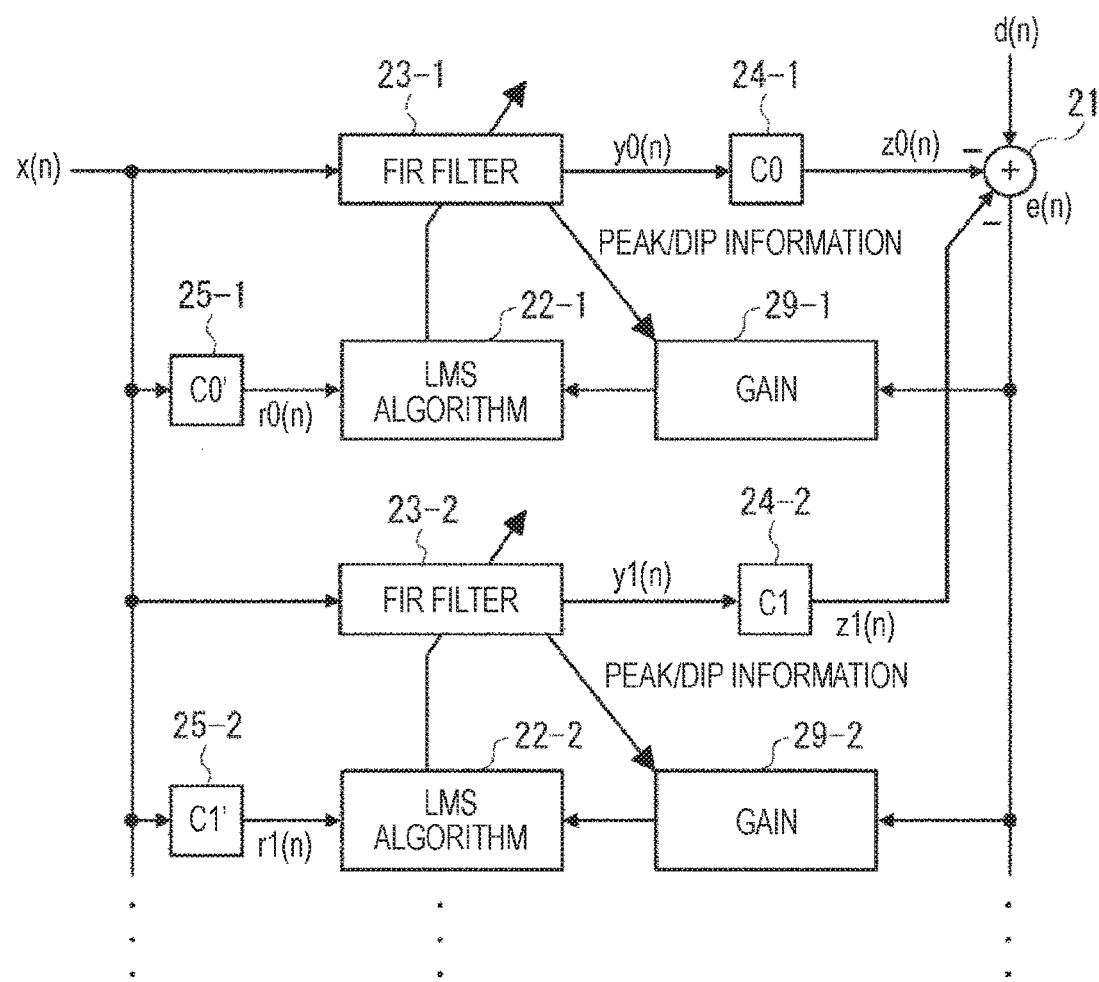
FIG. 12 is a block diagram illustrating a modified example of the noise cancelling system illustrated in FIG. 10.

FIG. 12 is a block diagram illustrating a modified example of the noise cancelling system illustrated in FIG. 10.

According to the noise cancelling system 51A illustrated in FIG. 12, each of the error signal processing units 63 of the control device 61 functions as a gain block 29. More specifically, the gain block 29 is provided in place of the band-limiting filter block 28 illustrated in FIG. 11. In this case, each of error signal processing units 63A performs signal processing for the error signal e(n) supplied from the microphone 13 by dynamically decreasing a gain in a route containing a large peak or dip, and dynamically increasing a gain in a route containing a small peak or dip in accordance with an amplitude frequency characteristic.

As described above, more stable and effective noise reduction is also achievable by providing the gain block 29 in the noise cancelling system 51A when the band-limiting filter block 28 is difficult to provide for a reason of implementation constraint, for example. This example is effective in a configuration given a smaller volume of resources for signal processing in comparison with the configuration including the band-limiting filter block 26. Furthermore, reduction of noise is more stabilized by controlling the gain of the gain block 29 in accordance with the peak/dip information.

Note that the respective processes described with reference to the foregoing flowcharts need not be processed in time series in the orders shown in the respective flowcharts, but may include processes executed in parallel or individually (such as parallel processes or processes for each object). Moreover, the program may be processed by a single CPU, or by a plurality of CPUs for separate processing.

Moreover, a series of processes described above (information processing method) may be executed either by hardware or software. When the series of processes are executed by software, programs constituting the software are installed from a program recording medium where the programs are recorded, to a computer incorporated into a dedicated hardware, or a general-purpose personal computer or the like capable of executing various functions under various types of programs installed to the computer.

Figure 13:
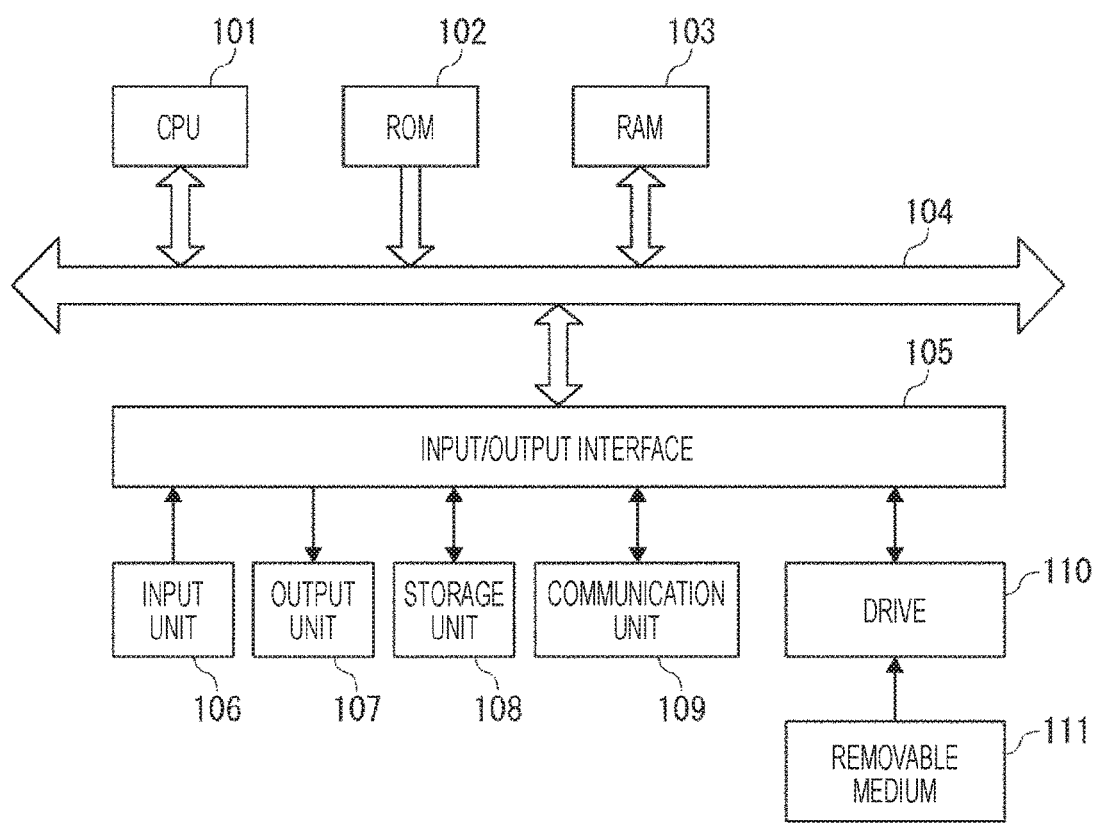
FIG. 13 is a block diagram illustrating a configuration example of a computer in an embodiment to which the present technology has been applied.

FIG. 13 is a block diagram illustrating a configuration example of hardware of a computer which executes a series of the processes described above under programs.

A central processing unit (CPU) 101, a read only memory (ROM) 102, and a random access memory (RAM) 103 are connected with each other via a bus 104 in computer.

An input/output interface 105 is further connected with the bus 104. Further connected with the input/output interface 105 are an input unit 106 constituted by a keyboard, a mouse, a microphone or the like, an output unit 107 constituted by a display, a speaker or the like, a storage unit 108 constituted by a hard disk, a non-volatile memory or the like, a communication unit 109 constituted by a network interface or the like, and a drive 110 which drives a removable medium 111 constituted by a magnetic disk, an optical disk, a magneto-optical disk, a semiconductor memory or the like.

According to the computer having this configuration, the CPU 101 loads and executes programs stored in the storage unit 108 to the RAM 103 via the input/output interface 105 and the bus 104 to perform the foregoing series of processes, for example.

The programs executed by the computer (CPU 101) are recorded in the removable medium 111 corresponding to a package medium constituted by a magnetic disk (including flexible disk), an optical disk (such as a compact disc-read only memory (CD-ROM) and a digital versatile disc (DVD)), a magneto-optical disk, a semiconductor memory or the like, or are presented via a wired or wireless transmission medium such as a local area network, the Internet, and digital satellite broadcasting.

In this case, the programs may be installed in the storage unit 108 via the input/output interface 105 with attachment of the removable medium 111 to the drive 110. Alternatively, the programs may be received by the communication unit 109 via a wired or wireless transmission medium, and installed in the storage unit 108. Instead, the programs may be installed in the ROM 102 and the storage unit 108 beforehand.

Note that the present technology may have the following configurations.

(1)

A noise reduction device including:

a reference signal processing unit that performs signal processing for generating a reference signal representing a waveform of noise corresponding to a reduction control target on the basis of an estimation value indicating estimation of an acoustic characteristic in a route from an output unit to an error measurement unit, the error measurement unit measuring an error corresponding to a waveform of a synthetic wave produced by synthesizing the noise, and a sound wave output from the output unit to cancel the noise;

an error signal processing unit that performs signal processing for an error signal representing a waveform of the error measured by the error measurement unit, in accordance with an amplitude-frequency characteristic obtained from the acoustic characteristic;

a filter coefficient calculation unit that calculates a filter coefficient with which the error signal becomes zero under adaptive algorithm with reference to the reference signal; and a filter unit that filters the reference signal by using the filter coefficient calculated by the filter coefficient calculation unit to obtain a control signal, and supplies the control signal to the output unit, wherein the reference signal processing unit, the error signal processing unit, the filter coefficient calculation unit, and the filter unit are provided for each of a predetermined number of the output units.

(2)

The noise reduction device according to (1) described above, wherein the error signal processing unit functions as a filter block that limits a frequency band containing a peak or a dip of amplitude on the basis of the amplitude-frequency characteristic.

(3)

The noise reduction device according to (1) described above, wherein the error signal processing unit functions as a gain block that controls a gain on the basis of the amplitude-frequency characteristic in accordance with a level of a peak or a dip of amplitude.

(4)

The noise reduction device according to any one of (1) through (3) described above, further including a peak/dip information acquisition unit that supplies, to the error signal processing unit, information indicating the peak or the dip of the amplitude-frequency characteristic acquired by performing fast Fourier transform analysis for the control signal output from the filter unit in real time, wherein the error signal processing unit dynamically performs signal processing on the basis of the information indicating the peak or the dip of the amplitude-frequency characteristic.

(5)

A noise reduction method including steps of:

performing signal processing for generating a reference signal representing a waveform of noise corresponding to a reduction control target on the basis of an estimation value indicating estimation of an acoustic characteristic in a route from an output unit to an error measurement unit, the error measurement unit measuring an error corresponding to a waveform of a synthetic wave produced by synthesizing the noise, and a sound wave output from the output unit to cancel the noise;

performing signal processing for an error signal representing a waveform of the error measured by the error measurement unit, in accordance with an amplitude-frequency characteristic obtained from the acoustic characteristic;

calculating a filter coefficient with which the error signal becomes zero under adaptive algorithm with reference to the reference signal; and filtering the reference signal by using the filter coefficient to obtain a control signal, and supplying the control signal to the output unit, wherein the signal processing for generating the reference signal, the signal processing for the error signal, the calculation of the filter coefficient, and the filtering of the reference signal are performed for each of a predetermined number of the output units.

(6)

A program under which a computer executes a noise reduction process that includes steps of:

performing signal processing for generating a reference signal representing a waveform of noise corresponding to a reduction control target on the basis of an estimation value indicating estimation of an acoustic characteristic in a route from an output unit to an error measurement unit, the error measurement unit measuring an error corresponding to a waveform of a synthetic wave produced by synthesizing the noise, and a sound wave output from the output unit to cancel the noise;

performing signal processing for an error signal representing a waveform of the error measured by the error measurement unit, in accordance with an amplitude-frequency characteristic obtained from the acoustic characteristic;

calculating a filter coefficient with which the error signal becomes zero under adaptive algorithm with reference to the reference signal; and filtering the reference signal by using the filter coefficient to obtain a control signal, and supplying the control signal to the output unit, wherein the signal processing for generating the reference signal, the signal processing for the error signal, the calculation of the filter coefficient, and the filtering of the reference signal are performed for each of a predetermined number of the output units.

Note that the present embodiment is not limited to the embodiment described above, but may be practiced with various modifications without departing from the subject matters of the present disclosure.

REFERENCE SIGNS LIST

11 Noise cancelling system
12, 13 Microphone
14 Speaker
15 Control device
21 Adder
22 LMS algorithm block
23 FIR filter block
24 Filter block
25 Estimation filter block
26 Band-limiting filter block
27 Gain block
28 Band-limiting filter block
29 Gain block
51 Noise cancelling system
61 Control device
62 Reference signal processing unit
63 Error signal processing unit
64 Coefficient calculation unit
65 Filter unit
66 Peak/dip information acquisition unit

The invention claimed is:

1. A noise reduction device, comprising:
at least one microphone;
at least one speaker; and
a central processing unit (CPU) configured to:
  generate a reference signal based on an estimation value,
  wherein the reference signal represents a waveform of noise, wherein the waveform of noise corresponds to a reduction control target,
  wherein the estimation value indicates estimation of an acoustic characteristic in a route from the at least one speaker to the at least one microphone,
  wherein the at least one microphone is configured to measure an error corresponding to each of a sound wave and a waveform of a synthetic wave,
  wherein the synthetic wave is based on synthesis of the noise, and
  wherein the at least one speaker is configured to output the sound wave to cancel the noise;
  obtain an amplitude-frequency characteristic from the acoustic characteristic;
  process an error signal based on the amplitude-frequency characteristic, wherein the error signal includes a waveform of the error;
  calculate a filter coefficient with which the error signal becomes zero under adaptive algorithm with reference to the reference signal;
  filter the reference signal based on the filter coefficient to obtain a control signal; and
  supply the control signal to the at least one speaker.

2. The noise reduction device according to claim 1, further comprises a filter block, wherein the CPU is further configured to control the filter block to limit a frequency band based on the amplitude-frequency characteristic, and wherein the frequency band comprises one of a peak of amplitude or a dip of amplitude.

3. The noise reduction device according to claim 1, wherein the CPU is further configured to control a gain of the sound wave based on the amplitude-frequency characteristic and based on one of a level of a peak of amplitude or a level of a dip of amplitude.

4. The noise reduction device according to claim 1, further comprising a filter block, wherein the CPU is further configured to:
control the filter block to output the control signal in real time;
acquire one of a peak of the amplitude-frequency characteristic or a dip of the amplitude-frequency characteristic based on fast Fourier transform analysis for the control signal;
supply information indicating one of the peak of the amplitude-frequency characteristic or the dip of the amplitude-frequency characteristic to the at least one microphone; and
wherein the process the error signal based on the information indicating the peak of the amplitude-frequency characteristic or the dip of the amplitude-frequency characteristic.

5. A noise reduction method, comprising:
generating a reference signal based on an estimation value,
wherein the reference signal represents a waveform of noise, wherein the waveform of noise corresponds to a reduction control target, and
wherein the estimation value indicates estimation of an acoustic characteristic in a route from at least one speaker to at least one microphone,
measuring an error corresponding to each of a sound wave and a waveform of a synthetic wave,
wherein the synthetic wave is based on synthesis of the noise;
outputting the sound wave from the at least one speaker to cancel the noise;
obtaining an amplitude-frequency characteristic from the acoustic characteristic;
processing an error signal based on the amplitude-frequency characteristic,
wherein the error signal includes a waveform of the error;
calculating a filter coefficient with which the error signal becomes zero under adaptive algorithm with reference to the reference signal;
filtering the reference signal based on the filter coefficient to obtain a control signal; and
supplying the control signal to the at least one speaker.

6. A non-transitory computer-readable medium having stored thereon computer-executable instructions that, when executed by a processor, cause a computer to execute operations, the operations comprising:

generating a reference signal based on an estimation value, wherein the reference signal represents a waveform of noise, wherein the waveform of noise corresponds to a reduction control target, and wherein the estimation value indicates estimation of an acoustic characteristic in a route from at least one speaker to at least one microphone;

measuring an error corresponding to each of a sound wave and a waveform of a synthetic wave, wherein the synthetic wave is based on synthesis of the noise;

outputting the sound wave is from the at least one speaker to cancel the noise;

obtaining an amplitude-frequency characteristic from the acoustic characteristic;

processing an error signal based on the amplitude-frequency characteristic, wherein the error signal includes a waveform of the error;

calculating a filter coefficient with which the error signal becomes zero under adaptive algorithm with reference to the reference signal;

filtering the reference signal based on the filter coefficient to obtain a control signal; and supplying the control signal to the at least one speaker.

* * * * *